United States Patent
Halldorsson et al.

(10) Patent No.: US 7,463,341 B2
(45) Date of Patent: Dec. 9, 2008

(54) METHOD AND APPARATUS FOR DETECTING WIND VELOCITIES BY MEANS OF A DOPPLER-LIDAR SYSTEM

(75) Inventors: Thorsteinn Halldorsson, Munich (DE); Michael Hofmann, Munich (DE); Gerald Sobotta, Sauerlach (DE)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 10/552,067

(22) PCT Filed: Apr. 3, 2004

(86) PCT No.: PCT/DE2004/000694

§ 371 (c)(1),
(2), (4) Date: Dec. 28, 2006

(87) PCT Pub. No.: WO2004/092767

PCT Pub. Date: Oct. 28, 2004

(65) Prior Publication Data

US 2007/0171397 A1    Jul. 26, 2007

(30) Foreign Application Priority Data

Apr. 10, 2003   (DE) ............................. 103 16 762.5

(51) Int. Cl.
  *G01P 3/36*   (2006.01)
(52) U.S. Cl. .................................................. 356/28.5
(58) Field of Classification Search ................ 356/28.5, 356/3.01–3.15, 4.01–4.1, 5.01, 5.15, 6–22, 356/28

See application file for complete search history.

(56) References Cited

U.S. PATENT DOCUMENTS

| 4,195,931 | A |   | 4/1980  | Hara |
| 5,088,815 | A |   | 2/1992  | Garnier et al. |
| 5,214,484 | A |   | 5/1993  | De Mollerat du Jeu |
| 5,216,477 | A | * | 6/1993  | Korb .......................... 356/28.5 |
| 6,313,908 | B1 | * | 11/2001 | McGill et al. .............. 356/28.5 |
| 6,894,768 | B2 | * | 5/2005  | Caldwell et al. .............. 356/28 |

FOREIGN PATENT DOCUMENTS

DE    40 13 702  A1    10/1991

* cited by examiner

*Primary Examiner*—Thomas H Tarcza
*Assistant Examiner*—Luke D Ratcliffe
(74) *Attorney, Agent, or Firm*—Crowell & Moring LLP (57) ABSTRACT

In the case of a method of detecting wind velocities by means of a Doppler-lidar system (10), a laser beam of a defined frequency generated by means of a laser (11) is emitted by a transmitting device (12) toward a space area and the light backscattered from the space area is received by means of a receiving telescope (13). For determining a Doppler shift, an interferogram is generated by means of an interferometer (16), the intensity distribution of the interferogram being directly measured by means of a photodetector (17). The measured intensity distribution is compared with one or more reference patterns which had previously been determined for defined parameters and are filed in a memory device (18*a*). From the comparison, the Doppler shift is determined as a measurement for the wind velocity. The Doppler-lidar system (10) comprises an analyzing unit (18*a*, 18*b*) for implementing the method, having a comparison unit (18*b*) for the comparison of reference patterns with the measured interferogram.

20 Claims, 3 Drawing Sheets

METHOD AND APPARATUS FOR DETECTING WIND VELOCITIES BY MEANS OF A DOPPLER-LIDAR SYSTEM

BACKGROUND AND SUMMARY OF THE INVENTION

This application claims the priority of German patent document 103 16 762.5, filed Apr. 10, 2003 (PCT International Application No. PCT/DE2004/000694, filed Apr. 3, 2004), the disclosure of which is expressly incorporated by reference herein.

The present invention relates to a method of detecting wind velocities using a Doppler-lidar system, and to a Doppler-lidar system for that purpose particularly on an board airplanes.

The detection of wind velocities and turbulence in the atmosphere is particularly important for air traffic. For example, harmful gusts which may act upon an airplane can lead to high dynamic loads on the structure of the airplane. In many cases, critical flight conditions may even occur because of particularly strong atmospheric turbulence which, in some extreme situations in the past, have even resulted in accidents. Furthermore, windshear and atmospheric turbulence have a negative effect on the flying comfort, and cause an increased fuel consumption.

Aeronautical engineers have attempted to measure windshear and atmospheric turbulence, and to compensate them by corresponding control surface deflections (that is, to control them actively). However, direct measurement of the air movement at the fuselage or at the wings by means of mechanical probes, such as acceleration or pressure sensors, is not suitable for this purpose, because sufficient time is not available to operate the wing actuator system. It is therefore necessary to measure the air movement by means of sensors in front of the airplane on its flight course in the apron, and thus several fractions of a second before the plane flies through it.

For active control of turbulence and windshear (for example, in the case of commercial aircraft), a minimum distance of approximately 50-200 m in front of the airplane is required. In addition, a resolution of the velocity of the air particles on the order of 1 m/sec. and their location in front of the airplane with a resolution in the range of the wing dimension of approximately 5-10 m depth are required. Weather radar, laser anemometers and lidar, for example, can be used for such remote-measuring methods.

In the case of weather radar systems, it is problematic that, for their backscatter measuring, they require large floating particles of a high density, such as water drops in clouds, and are therefore suitable only for an early warning with respect to weather clouds at a fairly large distance of up to some 10 kilometers. The most frequent air disturbances while the view is clear, such as windshear and so-called "clear air turbulence" in the troposphere and jet streams in the stratosphere, in contrast, cannot be detected by the weather radar because the wavelength of several centimeters (X band) is relatively long in comparison to the size of the air particles.

The use of Laser-Doppler anemometers (such as are used in fluid mechanics to diagnose air currents) has also been attempted. However, such anemometers require a sharp focusing of the laser measuring beam in order to generate sufficiently strong backscatter signals of individual aerosols (suspensions of fine liquid or solid particles in a gas) and can therefore be used only for measurements in the close range of a distance of not more than several meters. Such a system and method is described, for example, in German Patent Document DE 40 13 702 C and in S. Damp, "Battery-Driven Miniature LDA System with Semiconductor Laser Diode", in Application of Laser Anemometry to Fluid Mechanics, 4th International Symposium, Lisbon, Portugal, 1989.

In order to measure movements of small ultimate air particles of an expanded volume at a larger distance, it has therefore been attempted to use so-called Doppler-lidar Methods, which are divided into coherent and incoherent lidars. However, aerosol-lidar methods can detect floating particles or aerosols only when the frequency broadening of the Doppler backscatter signal is correspondingly small.

The article "Tracking Weather's Flight Path", in *IEEE Spectrum*, September 2000, Pages 38-45 discloses an aerosol-lidar system for the rough indication of wind or turbulence zones. Such aerosol-lidar systems with lasers in the infrared wavelength range of 2 μm or 10 μm have the advantage that smaller aerosols can be measured. However, because of their long pulse duration and low pulse frequency, they can be used only for large coverages in the range of from 5-20 km and for large measured volumes with edge lengths of from 50-500 m. Therefore, no control by control surface deflections can be carried out by means of such systems, but only a timely flying around large-area turbulence zones.

It has therefore been attempted to develop aerosol lidar systems with shorter wavelengths and a higher pulse frequency, as, for example, described in "*Aerosol and Cloud Backscatter at 1.064, 1.54 and 0.53 μm by Airborne Hard Target Calibrated Nd: YAG/Methane Raman Lidar*", Appl. Opt., Vol. 36, Pages 3475-3490 (1997). However, it is problematic that the density of the aerosols in many regions of the earth (particularly in air routes at high altitudes above the oceans) is too low to carry out reliable measurements for controlling air turbulence.

For this reason, it has been attempted to use aerosol scattering with Doppler-displaced backscattering on air molecules, to achieve a sufficiently high measuring reliability for flight controls at all flight altitudes and under all weather conditions. For example, the article by D. Rees and I. S. McDermid, "*Doppler Lidar Atmospheric Wind Sensor; Reevaluation of a 355-nm Incoherent Doppler Lidar*", Appl. Opt., Vol. 29, No. 28, Pages 4133-4144 (1990) discusses the measurement of molecular Doppler displacement in Doppler-lidar systems by means of Fizeau or Fabry-Perot interferometers with an incoherent reception. During spectral measurement, the received photons are distributed by way of an interference pattern with an imaging locally resolving detector on several receiving channels (specifically, in the Fabry-Perot interferometer to concentric interference rings, and in the Fizeau interferometer, to interference strips). However, the problem exists here that the recognition of weak signals becomes difficult in comparison to the noise of several individual receiving channels.

The general problem of Doppler-lidar measurements is therefore the low intensity of the backscatter of molecules as well as of aerosols. In order to minimize the laser power required for reliable measurements, a photodetector has to be used which is as sensitive as possible, and simultaneously the influence of noise by background radiation of the atmosphere and by electronic noise in the detector and amplifier are correspondingly efficiently suppressed.

The article by C. Nardell et al. "*Ground Winds New Hampshire and the LIDARFest 2000 Campaign*", SPI Internat. Symp. on Opt. Science and Technology, San Diego 2001, SPIE 4484-05, describes a Doppler lidar with direct reception and UV lasers which is suitable for measuring winds from the ground at different altitudes. Air movement is measured from a ground station by means of lasers in the UV range with an output power of several watts and receiving telescopes of a diameter of some ten centimeters to a few kilometers of height in the atmosphere. An integration of the weak backscatter signals over several seconds becomes possible in this case because the winds are stable over longer time periods. However, such systems and methods are not suitable for measuring air movements from an airplane, which requires significantly more compact systems with lasers having a lower power and lower receiving lens systems. Furthermore, signal analysis must be performed within only some ten milliseconds.

An article by P. B. Hays and J. Wang, "*Image Plane Detector for Fabry-Perot Interferometers: Physical Model and Improvement with Anticoincidence Detection*", Appl. Opt., Vol. 30, No. 22, Pages 3100-3107 (1991), illustrates a method for recording the movement of interference rings of a Fabry-Perot Interferometer using a special detector designed for this purpose. In this case, the geometry of the detector is adapted to the intensity course in the interference pattern. A photomultiplier with a conventional photocathode but with a special anode structure, is used, in which case concentric anode rings of varying width are used analogous to the radial intensity course in the interferogram. If the concentric ring-shaped interferogram is imaged on the photocathode of the photomultiplier, the photoelectrons are intensified and arrive on the concentrically arranged photo anode rings. A graduated charge imprint of the interference pattern is then created on the anode rings. From the displacement of the charge stages on the anode rings, the position of the interference ring of the Fabry-Perot interferometer can then be approximately determined. However, this method has the disadvantage that only a rough scanning of the interferogram can be carried out. Furthermore, measuring errors occur if the interferogram is not imaged concentrically with respect to the anode rings.

In order to overcome these disadvantages, J. Wu et al., "*Performance of a Circle-to-Line Optical System for a Fabry-Perot Interferometer: a Laboratory Study*", Appl.Opt., Vol. 33, Pages 7823-7828 (1994), describe a receiver in which, by means of a metal-coated interior surface of a cone, a quarter of the circular interferogram of the Fabry-Perot interferometer is reshaped to line structures and is imaged on a linear detector or a CCD array. However, this method has the disadvantage that only a quarter of the interferogram is utilized and optical distortions occur during the imaging which result in additional measuring errors.

C. L. Korb et al., "*Edge Technique Doppler Lidar Wind Measurements with High Vertical Resolution*", Appl. Opt., Vol. 36, 5976-5983 (1997), describes a method for determining the Doppler shift in molecule lidars by flank detection. A narrow-band spectral filter, such as the Fabry-Perot interferometer, is used to adjust the spectral band pass of the filter with respect to the Doppler-broadened line of the backscatter of the laser from the atmosphere, in such a manner that only a part of the spectrum is allowed to pass at its intensity flank. The smallest spectral displacements of the line are then registered as an intensity change along the flank by means of a single-channel detector, which then represent a measurement of the Doppler shift of the entire spectrum.

As in the so-called "fringe detect", this method of flank detection in molecular Doppler lidars has the disadvantage that only a portion of the received light is utilized. Furthermore, only a small portion of the available spectral information in the reception light is used to determine the Doppler shift. In addition, the technique is costly, because special and very expensive photo receivers must be used.

In the technique described in Todd D. Irgang et al., "Two-Channel Direct-Detection Doppler Lidar Employing a Charge-Coupled Device as a Detector", Appl. Optics, Vol. 41, No. 6, Pages 1145-1155 (2002), a Doppler-lidar system comprises a CCD detector. By using a converting device, which converts circular interference patterns of a Fabry-Perot measurement standard to strip-shaped patterns, such a linear device can be used. As a result, winds are to be measured by the backscattering of aerosols and molecules. The circular rings, which are emitted by the Fabry-Perot measurement standard, are converted by means of a reflecting cone to a linear strip series. However, use of the converter gives rise to optical errors and is costly.

One object of the present invention is to provide a method of measuring wind velocities using a Doppler lidar system which is suitable for a subsequent flight control for the controlling of turbulence or windshear in the aviation field and ensures a high measuring reliability.

Another object of the invention is to provide a Doppler lidar system which can detect windshear and turbulence with high precision, so that turbulence or windshear can be controlled.

These and other objects and advantages are achieved by the method and apparatus for detecting wind velocities according to the invention, which is particularly suitable for use on board airplanes.

In the method according to the invention, a laser beam of a defined frequency is emitted toward a space area and the light backscattered from the space area is received. An interferogram is then generated for determination of a Doppler shift by means of an interferometer; and a photodetector is used to measure the intensity distribution of the interferogram. The intensity distribution is then compared with one or more reference patterns which were previously determined for defined parameters, and the Doppler shift is determined from the comparison as a measurement for the wind velocity.

The method according to the invention ensures a sufficiently high measuring reliability for the flight control at all flight altitudes and under all weather conditions because, in addition to the backscattering of the light on aerosols, the Doppler-shifted backscattering on air molecules is determined with high precision and is used for the wind measurement. Since the density of the air molecules varies by not more than a factor 5 at typical flight altitudes of up to 40,000 feet, the reference patterns or expected measuring signals are very reliable and can be determined in a stable manner for any flight altitude in all regions of the earth. By means of the invention, the receiving and analyzing method in the case of Doppler measurements is improved in such a manner that, when the transmission power of the laser is reduced, a sufficiently high measuring reliability for the flight control is obtained under the most different atmospheric conditions. Thus, windshear and gusts can be determined by means of a compact system at measuring distances of, for example, 50-200 from the airplane while using the direct incoherent reception in order to permit controlling by the airplane control system.

The invention eliminates the above-described disadvantages of the prior art, because the light which is allowed to pass through the interferometer can be completely utilized; and, in addition, all of the information which is contained in the geometrical distribution of the light intensity in the imaging plane of the interferometer can be used for recording the Doppler shift. In particular, the used method is designed such that it is as insensitive as possible with respect to signal noise and optical aberrations and disturbances in the interferometer. Furthermore, the used parts of the selected photoreceivers are conventionally obtainable.

To facilitate backscattering of the laser light in the mixture of molecules and aerosols and, in addition, on condensed water droplets in clouds, preferably a short-wave laser light (particularly in the UV-range) is used. All conditions of the atmosphere can thereby be detected.

It should be taken into account that the increase of the intensity of the backscatter signals on air molecules takes place proportionally to $\lambda^{-4}$, wherein $\lambda$ is the wavelength of the laser beam. Laser wavelengths are therefore used which are as short as possible and preferably are in the UV range. This results in the additional advantage that also a short pulse duration, for example, <10 ns, and a high pulse repetition frequency, for example, >100 Hz, can be reached by means of commercially sold lasers, such as frequency-tripled or -quadrupled Nd:YAG lasers at 0.355 µm or 0.266 µm, so that a sufficiently high local resolution is achieved. A sufficient atmospheric transmission exists up to a lower limit in the UV of approximately 0.230 µm for remote measurements up to some hundred meters at all flight altitudes.

The invention also resolves the problem of the spectral broadening of the laser backscatter on molecules because of thrusts and thermal movement of the molecules. This broadening may be, for example, by a factor from 10-100 greater than the smallest Doppler frequency shift on atmospheric turbulence which is to be detected. This broadening of the reception signal to a greater spectral range had heretofore made it so difficult to detect the Doppler shift in the spectrally uniformly distributed noise that sufficiently precise measurements were not possible. By means of the invention, the Doppler shift can be determined in a precise manner despite the spectral broadening.

In particular, in the invention, the optical beam path of the lidar is designed such that the entire interference pattern or interferogram is imaged directly, without any conversion, calibration or local adjustment on a two-dimensional detector array. Simultaneously, during the signal analysis, for example, all previous knowledge concerning the local distribution of the optical reception signals on the detector surface to be expected is used for determining the Doppler shift.

The invention is based on the recognition that the shape and broadening of the molecular backscatter spectrum in a narrow-band laser frequency of a monomode type, represents a well-defined spectral line whose intensity course can be pre-calculated as a function of the atmospheric density and temperature; that is, the measuring altitude of the airplane above sea level. In particular, with the additional knowledge of the transfer function of the interferometer (which can also be computed or measured with sufficient precision), the expected profiles of the intensity distribution in the photodetector plane of the interferometer can be determined for any density and air temperature and can be stored as progression of values in a, for example, two-dimensional look-up table. By comparing these modeled spectral profiles with the actual measured spectrums, and the thereby determining deviations, the Doppler line shift can be defined as a function of the air velocity for any flight altitude in real time.

Advantageously, in the case of the method according to the invention, the ring-shaped interferogram of a Fabry-Perot interferometer is imaged directly on the 2-dimensional photodetector. This results in an imaging on the surface-type photoreceiver without any optical conversion and without any shadowing. Thus, for example, the scattered Doppler-shifted laser signal of an airplane from the atmosphere can be utilized completely in the Doppler lidar system with the Fabry-Perot interferometer, so that no information loss occurs as a result of the optical conversion.

The reference patterns preferably contain different densities and/or temperatures of the atmosphere as parameters. As a result, reference patterns exist for different atmospheric conditions which prevail, for example, at different altitudes, and the reference pattern is selected which has the smallest deviation with respect to the taken interferogram. The theoretically expected complete intensity distribution previously obtained from a model computation can be used to compute the parameters. The model computation includes modeling of the laser transmission beam, the molecule velocity distribution and the modeling of the interferometer transfer function. By comparing the interferogram taken by an intensified CCD camera (for example, in the form of 2-dimensional halftone pictures), with the family of reference patterns, the air velocity in the space area to be measured can be implemented, as well as a determination of various atmospheric parameters, such as the measured volume temperature or the pressure of the measured volume.

The at least one reference pattern therefore contains, for example, the velocity of the atmosphere relative to the Doppler-lidar system as a parameter.

Advantageously, the variation of the velocity of the atmosphere relative to the Doppler-lidar system is determined from several successive measurements. From the variations caused by turbulence or windshear (which are fast in comparison to the flight velocity), the atmospheric velocity can then be determined in the space area situated in front of the airplane.

The laser beam preferably is pulsed and a portion of a laser pulse is in each case used to determine a time-related reference point. The distance of the backscattering space area can be determined based on the propagation time of the residual portion of the laser pulse.

Preferably, a portion of the laser beam is received and recorded directly (that is, without any backscattering in the atmosphere), so that a transfer function of the optical components of the system can be defined or a calibration can be carried out from the intensity distribution.

Preferably, the density and/or the temperature of the space area is determined from the reference pattern with the smallest deviation from the measured interferogram.

The method according to the invention is well suited for use on board a moving system, such as an airplane, a helicopter, other aircraft, or a ship; it can also be used on the ground.

Furthermore, the expected intensity distribution of the reference pattern can also be computed from measured atmospheric parameters and/or flight parameters of an aircraft, or the stored reference pattern with the smallest deviation with respect to the recorded interferogram can be further adapted by means of measured parameters.

The laser beam is advantageously transmitted in different directions in order to determine the wind velocity vector, and thus the magnitude and direction of the wind velocity in the space area to be measured.

According to another aspect of the invention, a Doppler-lidar system is provided for detection of wind velocities, particularly on board airplanes. The system according to the invention includes a transmitting device for emitting a laser beam, a receiving device for receiving the laser beam backscattered in the atmosphere, an interferometer for generating an interferogram from the backscattered laser beam, a photodetector for determining the intensity distribution of the interferogram, and an analyzing unit for defining the Doppler shift as a measurement for the wind velocity of the atmosphere. The interferogram is imaged directly on the photodetector, and the analyzing unit comprises a memory with one or more reference patterns, which apply to previously defined atmospheric parameters. A comparison unit comprises the imaged interferograms with the reference patterns in order to determine the wind velocity from the comparison.

The Doppler-lidar system according to the invention makes it possible to determine the wind velocity or turbulence ahead of an airplane with high precision, in such a manner that a control by means of a corresponding flap control can take place when flying through the space area to be measured. As a result, the invention, on the one hand, contributes to flight safety and, on the other hand, flight comfort is noticeably improved, and fuel costs are also reduced.

The photodetector advantageously is a 2-dimensional photodetector which comprises an image intensifier and a CCD or CMOS array. This results in low cost because the photodetector is commercially and conventionally obtainable.

A transfer path for a portion of the laser beam is preferably provided between the transmitting device and the receiving device in order to record the generated laser beam directly in the receiving device. A fiberglass cable, for example, is provided which couples the laser beam of the transmitting device branched off by means of a beam splitter with a receiving telescope of the receiving device. This permits direct recording of the emitted laser beam, and thus a determination of the transmission function of the receiving device by means of the components existing therein. Furthermore, the receiving device can be calibrated from time to time.

In addition, the laser beam guided directly to the receiving device can be used as a time reference to define the transit time of the emitted and backscattered laser beam. As a result, the measuring distance (that is, the distance of the space area in which the air velocity is determined) can be defined.

The interferometer, preferably is a Fabry-Perot interferometer, and the interferogram is preferably ring-shaped, comprising concentric rings of the intensity distribution.

The laser advantageously generates pulsed laser beams in the UV range. As a result, it is possible to measure precisely the backscattering on air molecules, and to determine the Doppler shift.

The Doppler-lidar system preferably comprises field-programmable gate arrays for fast comparison of the reference patterns in real time.

The analyzing unit according to the invention advantageously comprises a module for defining the transfer function of the components of the receiving device, and the Doppler-lidar system is preferably equipped with corresponding components for implementing the method according to the invention.

Advantages and characteristics, which are described in connection with the method according to the invention, also apply to the Doppler-lidar system, and the advantages and characteristics applying to the Doppler-lidar system also apply to the method according to the invention.

Other objects, advantages and novel features of the present invention will become apparent from the following detailed description of the invention when considered in conjunction with the accompanying drawings.

DETAILED DESCRIPTION OF THE DRAWINGS

Figure 1:
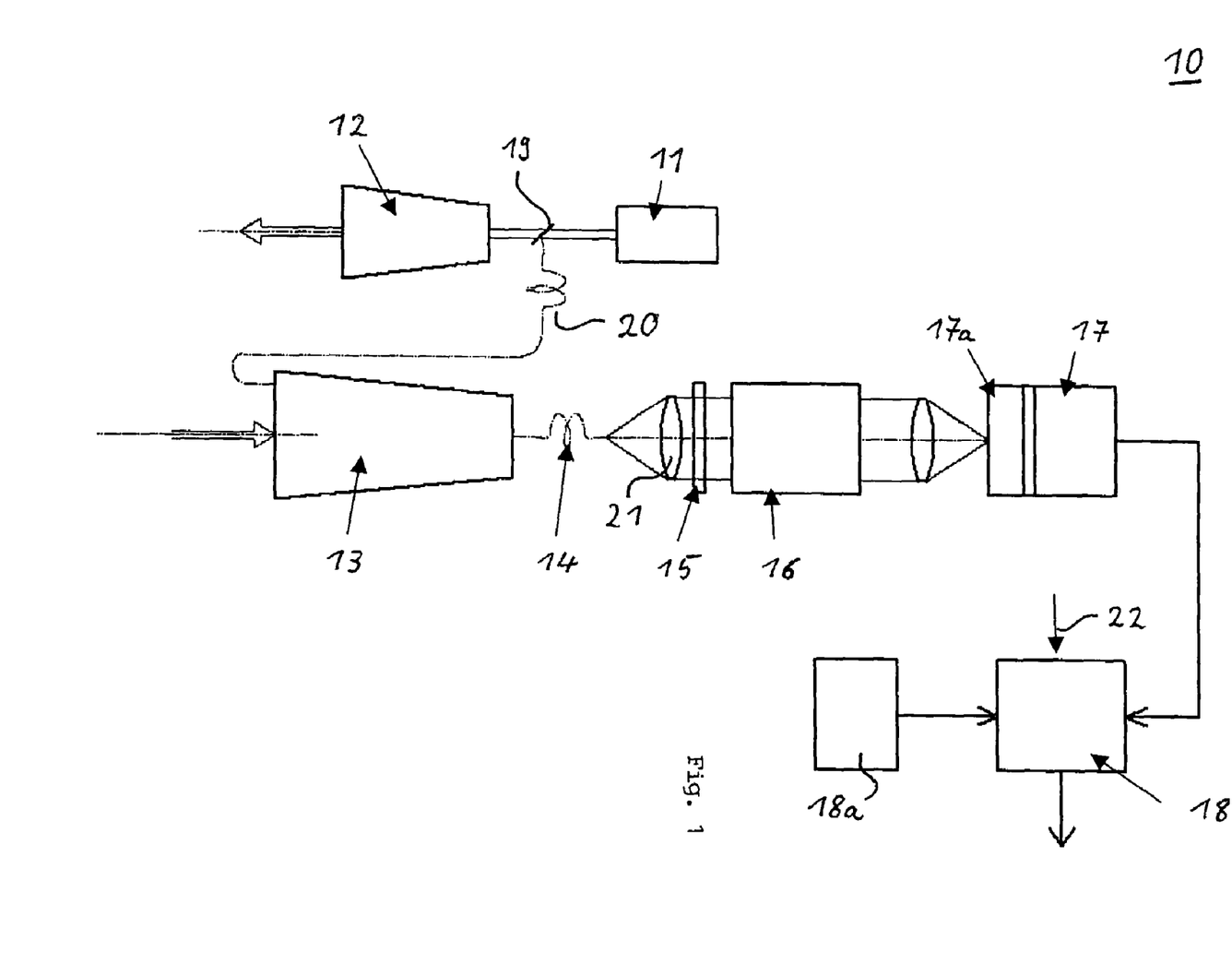
FIG. 1 is a schematic representation of a Doppler-lidar system according to a preferred embodiment of the invention.

FIG. 1 shows a Doppler-lidar system 10 as a preferred embodiment of the invention. A laser 11, which generates a pulsed laser beam, is optically coupled to a transmission telescope 12 for transmitting a laser beam in a defined direction into the atmosphere. The laser 11 and the transmission telescope 12 thereby form a transmitting device for emitting the laser beam. A receiving device in the form of a receiving telescope 13 is used for receiving the laser beam backscattered in the atmosphere. The received laser beam is fed to an interferometer 16 by way of an optical fiber 14 and a filter unit 15U. In this preferred embodiment, the interferometer 16 is a Fabry-Perot interferometer.

A photodetector 17 is used to determine the intensity distribution of an interferogram generated by the interferometer 16 from the fed laser beam. The photodetector 17 is arranged with respect to the interferometer 16 such that (for example, ring-shaped) interferogram is imaged directly on the photodetector 17.

The output of the photodetector 17 is electrically coupled to an analyzing unit 18 which comprises a memory 18a and a comparison unit 18b in the form of a microprocessor. One or more reference patterns for interferograms which apply to defined atmospheric and, if necessary, additional parameters, are stored in the memory 18a. The comparison unit 18b is used to compare the interferogram imaged on the photoreceiver 17 with the one or more reference patterns, and to determine the wind velocity from the comparison. For the adaptation, computation or alteration of the reference pattern, additional parameters can be fed to the comparison unit 18b as input data 22.

A beam splitter 19, which is connected between the laser 11 and the transmission telescope 12, branches off a portion of the laser beam generated by the laser 11, and feeds it to the receiving telescope 13 via a transfer path 20 in the form of an optical fiber or a reference measuring fiber. During operation, a small portion of the radiation emitted by the laser 11 thereby reaches the receiving telescope 13 by way of the transfer path 20, and is used to determine the starting point in time of the transit time of the emitted laser beam backscattered in the atmosphere at a defined distance. As a result, by determining the point in time of the reception, the distance is defined at which the wind velocity is to be measured.

Furthermore, the beam fed directly by the transmitting device is used to determine the transfer function of the optical reception system by means of its different components, such as the fiber 14, the filter 15 and the interferometer 16. In this case, the directly fed laser beam is fed to the interferometer 16, and the resulting interferogram is subsequently imaged on the photodetector 17.

The receiving telescope 13 receives the light backscattered from the measured volume, which is a defined space area. The received light is parallelized by an optical lens 21, and is transmitted to the filter 15 via an optical fiber 14. The filter 15 filters the laser beam backscattered from the atmosphere out of the background radiation of the sun.

In the beam path, the filter 15 is followed by the interferometer 16 which forms an interferogram from the fed light. As an alternative to the Fabry-Perot interferometer, the interferometer 16 may, for example, be a Fizeau interferometer.

In the case of the Fabry-Perot interferometer, the pattern generated by the interferometer consists of concentric circles, with the intensity distribution in the pattern and the distance of the circles from the center depending on the wavelength of the fed light, the spectrum of the laser, the Doppler shift, the Doppler broadening in the atmosphere, and the transfer function of the components of the reception channel.

The generated interferogram contains all measured information concerning the atmosphere and is imaged without an optical conversion or extraction or centering as a whole on the detector plane of the surface-type photodetector 17 with its 2-dimensional pixel structure.

Figure 2:
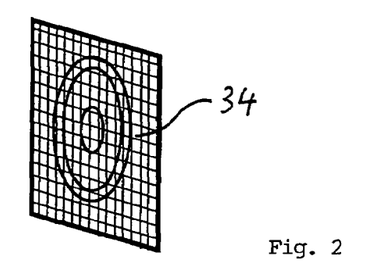
FIG. 2 is a schematic view of an interferogram on the photoreceiver of the system illustrated in FIG. 1.

FIG. 2 shows a typical intensity distribution in an interferogram 34 reproduced by the photoreceiver or the photodetector 17. Because of the discrete pixel structure and the typically weak optical reception signals, a step-type two-dimensional intensity image is formed which is fed to the comparison unit 18b implemented by a microprocessor.

Figure 3:
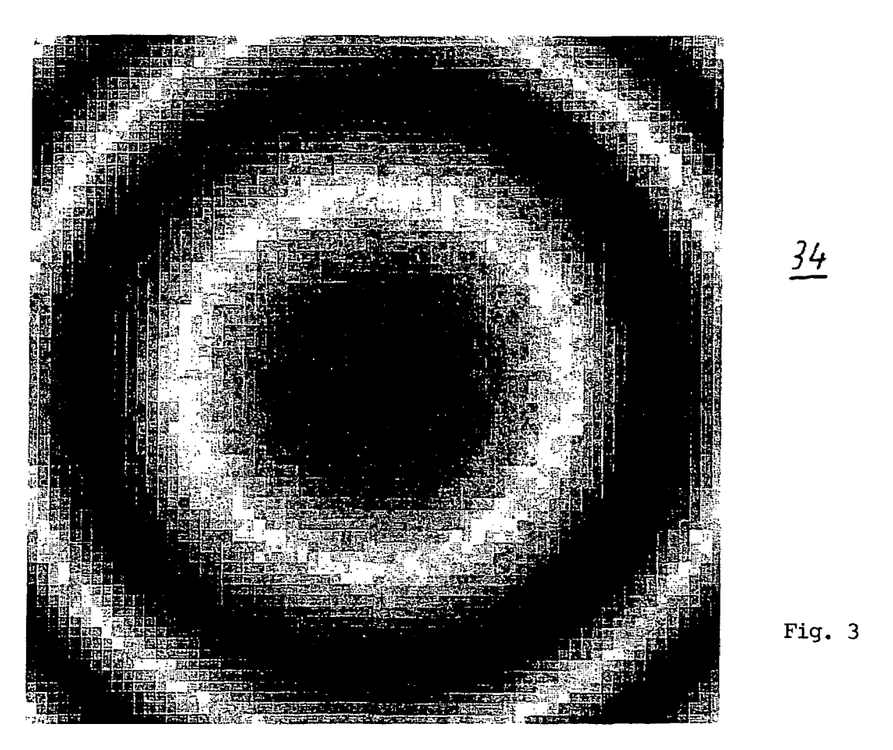
FIG. 3 shows a typical 2-dimensional interferogram in the case of a relatively low photon number.

FIG. 3 is used for a better illustration of the typical two-dimensional interferogram 34 in the case of a relatively low photon number. There, the intensity distribution of the concentric rings is illustrated in the form of halftone gradations. In the comparison unit 18b (FIG. 1), this intensity profile or intensity pattern is compared with reference patterns which are stored in the memory unit 18a in the form of look-up tables. During the analysis, the microprocessor selects that intensity distribution pattern from the one or more look-up tables which come(s) closest to the measured one. From this comparison, the searched value of the Doppler shift is obtained which is a parameter of the stored pattern, and the velocity of the air particles in the measured volume is derived therefrom.

The reference patterns (or family of reference patterns) can be generated in different fashions. For example, for different temperatures of the atmosphere and different air velocities, relative to the measuring system, different measuring systems may be generated and filed in the look-up tables. Furthermore, the pressure and the instrument function are used as parameters for determining the reference patterns. Likewise, it is conceivable to determine one or more of these parameters during the measuring operation by means of sensors, and to adapt the stored reference patterns on the basis of the actual values. The actual parameters determined by the additional sensors can then be fed to the comparison unit 18b in the form of input data 22. (See FIG. 1.)

This means that the different parameters which influence a measured interferogram are contained in the interference patterns, so that the reference patterns apply to different altitudes, temperatures, speeds of the airplanes and also to different instrument functions. The instrument function can either be measured or computed.

For measuring the transfer function of the reception system, a portion of the radiation of the laser is guided directly into the receiving telescope 13. The transfer function can then be determined in the interim between measurements of the backscattered laser light of the atmosphere, and taken into account in the further analysis.

During the analysis, essentially the intensity distributions of the reference pattern are compared with the intensity distribution of the measured interferogram. The spectrum of the light backscattered from the atmosphere contains a thrust broadening of the molecules as well as a thermal broadening which is a function of the respective temperature. As a result of the Doppler shift, the center of gravity of the spectrum is displaced. As mentioned above, the instrument function (that is, the transfer function of the optical components of the receiver) also affects the determined spectrum. All these factors are taken into account in the reference patterns.

The Doppler shift is measured by means of a certain measuring frequency which can be freely defined. During the time interval between the radiation of the transmission pulse and the reception of the backscattered laser light from the measured volume in the atmosphere, the transmission pulse (which is fed directly to the receiving telescope 13 by way of the transfer path) is measured by the photodetector 17. The intensity distribution in this interferogram constitutes the folding of the spectrum of the used laser and of the transfer function of all components of the reception system, such as the receiving telescope 13, the optical fiber or fiber 14, the lens 21, the filter 15 and the interferometer 16. This intensity distribution is used during measurement for completion of the look-up tables and/or for the monitoring of the adjustments of the entire system, particularly for the calibration.

When measuring the wind velocity within a space area at a distance from the measuring system by means of the Doppler-lidar system 10 illustrated in FIG. 1, the laser 11 is operated with a typical pulse duration of 10 ns, which corresponds to a pulse length of 1.5 m. In this case, the receiving device is adjusted such that the backscatter signal is received after a fixed pulse transit time from a fixed distance (for example, 100 m). The time reference is the point in time of the passing of the pulsed laser radiation through the aperture of the transmission telescope 12. This point in time is determined in feeding a portion of the radiation to the receiving telescope 13, via the transfer path 20 further developed as an optical fiber directly, without passing through the atmosphere.

In addition to this point in time or trigger, which is recorded by the photodetector 17, the spectral intensity distribution of the directly fed laser beam in the imaging plane of the interferometer 16 can also be recorded and stored on the photodetector 17. This result in the transfer function $F_0$ of all optical components as:

$$F_0 = f_{La} \varnothing f_{Fi} \varnothing f_{Fa} \varnothing \text{ and } f_{IF}, \tag{1}$$

wherein $\varnothing$ is the folding operator and $f_{La}$, $f_{Fi}$, $f_{Fa}$ and $f_{IF}$ represent the transfer functions of the optical components laser, filter, fiber and interferometer.

Since this function is the inherent instrument function and is changed only rarely (that is, only in the case of a misalignment and degradation of the system), it does not have to be stored with each pulse of the laser. (It can always be measured again for the initial self-calibration and monitoring of the system.) If the measuring system is stable enough, it is also possible to determine the instrument function purely mathematically, and to take it into account during further analyses. The analysis of these tests can be used during the calculation for supporting the data.

The light of the laser pulse which is backscattered at a later point in time from the measured volume in the atmosphere is taken in by the receiving telescope 13 and is fed via the same path as the previously directly fed laser light to the photoreceiver or photodetector 17 by way of the receiving telescope 13, the lens 21, the filter 14, the fiber 15 and the interferometer 16.

The laser light backscattered from the atmosphere is spectrally broadened and is spectrally shifted by the Doppler effect from the relative speed of the airplane through the air and the self-movement of the air mass. After passing through the receiving telescope 13, it is then still folded with the transfer function of the lens system $F_0$ and then represents the entire function F:

$$F = F_D \varnothing F_0 \tag{2}$$

The measured intensity course is compared with the stored two-dimensional field of possible intensity courses as a function of the atmospheric parameters density and temperature. The intensity course with the smallest difference between measurement and computation is used in a model-based analysis, or it can be improved by a corresponding interpolation or parameter adaptation. The Doppler function $F_D$ can now be obtained by mathematical unfolding from this intensity course. The density and the temperature of the air at corresponding flight altitudes can now also be obtained from the width and the course of the Doppler function.

On the other hand, it is also possible to precalculate the expected course of the Doppler function from the known air density and air temperature values (which are measured by means of other measuring instruments of the airplane) and, with the additional knowledge of the instrument function, mathematically obtain the Doppler shift from the measured displacement of the interferograms 34. From the Doppler shift and the alignment of the measuring axis from the airplane, the speed of the airplane can then be calculated with respect to the air mass and the internal movement of the air mass.

After direct imaging of the interferogram as a whole and without the optical conversion or extraction on the surface-type detector, such as a CCD array or CMOS array, a light intensification takes place using a multi-channel plate which forms an image intensifier 17a and is provided between the imaging plane of the interferometer 16 and the surface-type photodetector 17.

Subsequently, the interferograms are compared with the parameter calculations and/or stored information concerning the expected intensity course in the case of the used interferometer, the air temperature and the density by means of parallel-computing microprocessors, such as field-programmable gate arrays (FPGA). The reference values of the interferogram function are stored for different parameter sets (particularly the laser wavelength $\lambda$, the atmospheric density p and the air temperature T), in order to reduce the computing expenditures. As a result, all information present in the system itself as well as the information existing in each airplane concerning air density, temperature and its speed with respect to the air mass can be utilized.

Figure 4:
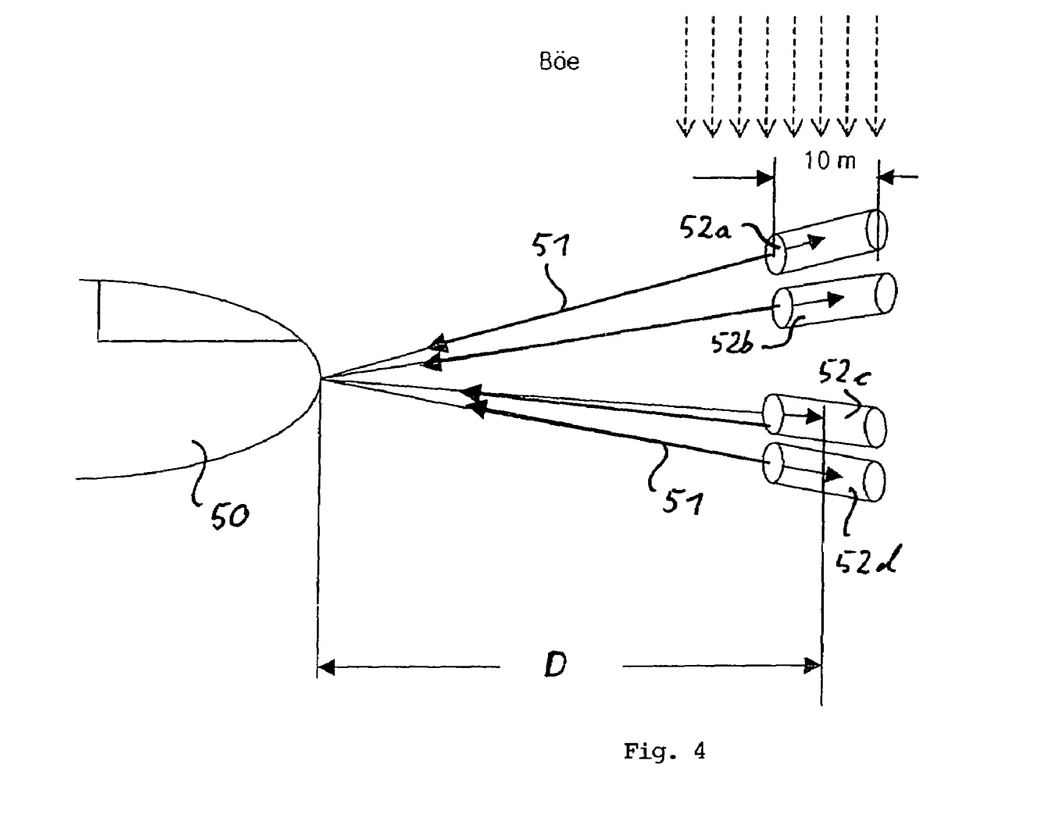
FIG. 4 illustrates a wind velocity measurement by means of the Doppler-lidar system according to the invention.

FIG. 4 is a schematic illustration of a wind velocity measurement by means of the Doppler-lidar system according to the invention on board an airplane 50. The different measuring beams 51 are emitted in different directions in order to scan the air space in front of the plane 50. The laser beams backscattered from different space areas 52a, 52b, 52c, 52d on aerosols and molecules are recorded as described above and analyzed so that the wind velocities are determined in the respective measuring direction in the respective space area. In this case, the distance D of the space areas 52a-d from the airplane 50 is, for example, 100 m. The measuring beam can be split into the plurality of measuring beams 51, for example, by means of a scanner placed in front, in which case the air space in front of the plane 50 is scanned simultaneously or successively in different directions. The space areas 52a-d have, for example, a dimension in the measuring direction of approximately 10 m.

By projecting into the different directions, the wind velocity vector can be determined from the individual measuring results. The Doppler velocity components measured in the respective laser transmission beam direction to an estimated velocity vector are processed, for example, by means of an overdetermined equation system with at least four individual measurements in the case of four measuring directions. Weighting factors are taken into account to reduce the amount of preceding measurements. The velocity computation of $v_n$ from the measuring sequence $m_1, m_2, m_3, m_4, \ldots, m_k$ is then followed by the velocity computation $v_{n+1}$ from the measuring sequence $m_2, m_3, m_4, m_5, \ldots, m_{k+1}$.

The invention permits a precise measurement of the wind velocity vector far in front of an airplane in real time by means of the interferometric measurement of the Doppler line displacement of pulsed laser beams backscattered on air molecules and aerosols. As a result of the arrangement according to the invention and the analyzing method according to the invention, a large coverage is achieved; that is, only reduced backscatter intensities are necessary for the analysis.

The measurement of gusts in real time far in front of the airplane (for example, at a distance which corresponds to 0.5 seconds of flying time) permits targeted control and trimming maneuvers to reduce the harmful effects of gusts on the airplane. For systems with a shorter coverage, for example, for measuring the relative wind velocity vector, further reduced assembly dimensions are conceivable.

The measurement can be carried out from moving measuring platforms, such as airplanes, helicopters, balloons, satellites or ships, or also from measuring stations on the ground.

For adjusting the measuring distance, a time window is defined when receiving measuring data, which time window is synchronized with the laser beam pulsing.

Processing of the measuring data can take place in real time. For this purpose, the reference values or patterns are computed in parallel using field-programmable arrays. The optimal parameters for the wavelength $\lambda$ and the temperature T of the measured volume can be determined therefrom. To reduce computing expenditures, the reference patterns, which represent reference values of the interferogram function, can be stored for different parameter sets $\lambda$ and T. In addition to the memory access, only the addition and sum formation for positive integers are required for the computation of the reference values, so that the surface requirement of the local computer units in the field-programmable gate array is minimized.

During the comparison of the interferogram of the laser radiation backscattered from the atmosphere with the family of reference patterns, the wavelength $\lambda$ and of the measured-volume temperature T is determined during the analysis. For the parameter computation, the theoretically expected complete intensity distribution is utilized which was previously obtained from a model computation. The model computation includes modeling of the laser beam, the molecule velocity distribution and the interferometer transfer function.

In addition to the detection of gusts or air turbulence, the Doppler-lidar according to the invention and the method according to the invention for detecting wind velocities can also be used for applications and operations on the ground, for example, for the detection of windshear at airports or for measuring wind profiles in the vertical direction through the atmosphere.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method of detecting wind velocities using a Doppler-lidar system, said method comprising:
   emitting a laser beam of a defined wavelength to a space area;
   receiving light backscattered from the space area;
   inputting the backscattered light into an interferometer which generates an interferogram; and
   imaging the interferogram onto a photodetector;
   comparing the interogram detected by the photodetector with a family of reference interferogram patterns which were previously determined for defined atmospheric parameters, which reference interferogram patterns comprise at least one of different densities and temperatures of the atmosphere;

determining a Doppler shift as a measurement of the wind velocity, based on the comparsion of the interferogram detected by the photodetector with the family of different reference interferogram patterns.

2. The method according to claim 1, wherein the interferogram is ring-shaped and is imaged directly on a two-dimensional photodetector.

3. The method according to claim 1, wherein the interferogram is strip-shaped and is imaged directly on a two-dimensional photodetector.

4. The method according to claim 1, wherein a reference pattern with the smallest deviation with respect to the measured interferogram is used to determine the Doppler shift.

5. The method according to claim 1, wherein the reference pattern takes into account the velocity of the atmosphere relative to the Doppler-lidar system as a parameter.

6. The method according to claim 1, wherein variation of the velocity of the atmosphere relative to the Doppler-lidar system is determined from several successive measurements.

7. The method according to claim 1, wherein:
the laser beam is pulsed; and
a portion of a laser pulse is in each case used for defining a time-related reference point in order to determine the distance of the backscattering space area by means of the transit time of a residual portion of the laser pulse.

8. The method according to claim 1, wherein:
a portion of the laser beam is received and recorded directly and without backscattering; and
from the intensity distribution, a transfer function of optical components is determined or a calibration is carried out.

9. The method according to claim 1, wherein at least one of density and temperature of the space area is determined based on the reference pattern with a smallest deviation with respect to the measured interferogram.

10. The method according to claim 1, wherein the method is implemented on board a moving system.

11. The method according to claim 1, wherein an expected intensity distribution of the reference pattern is computed from at least one of measured atmospheric parameters and flight parameters of an airplane.

12. The method according to claim 1, wherein the laser beam is emitted in different directions in order to determine the wind velocity vector by measuring the Doppler shift in said different directions.

13. A Doppler-lidar system for detecting wind velocities, said system comprising:
a transmitting device for emitting a laser beam;
a receiving device for receiving light including the laser beam backscattered in the atmosphere;
an interferometer for generating an interferogram from the backscattered laser beam;
a photodetector for determining an intensity distribution of the interferogram, which is imaged directly on the photodetector; and
an analyzing unit for determining a Doppler shift as a measurement of the wind velocity of the atmosphere;
wherein the analyzing unit has,
a memory that contains a family of reference interferogram patterns associated with previously defined atmospheric parameters which comprise at least one of different densities and different temperatures of the atmosphere; and
a comparison unit which determines the Doppler shift as a measure of wind velocity, by comparing the imaged interferogram detected by the photodetector with the family of reference patterns.

14. The Doppler-lidar system according to claim 13, wherein the photodetector is a two-dimensional photodetector which comprises an image intensifier and one of a CCD and a CMOS array.

15. The Doppler-lidar system according to claim 13, wherein a transfer path for a portion of the laser beam is provided between the transmitting device and the receiving device in order to record the generated laser beam directly in the receiving device.

16. The Doppler-lidar system according to claim 13, wherein the interferometer is a Fabry-Perot interferometer which generates ring-shaped interference patterns.

17. The Doppler-lidar system according to claim 13, wherein the interferometer is a Fizeau interferometer which generates strip-shaped interference patterns.

18. The Doppler-lidar system according to claim 13, wherein the transmitting device comprises a laser which generates pulsed laser beams in the UV range.

19. The Doppler-lidar system according to claim 13, further comprising field-programmable gate arrays for computing the reference patterns.

20. The Doppler-lidar system according to claim 13, wherein the analyzing unit comprises a module for determining the transfer function of components on the reception side of the Doppler-lidar system.

* * * * *